(12) United States Patent
Wang et al.

(10) Patent No.: US 8,253,690 B2
(45) Date of Patent: Aug. 28, 2012

(54) ELECTRONIC DEVICE, CHARACTER INPUT MODULE AND METHOD FOR SELECTING CHARACTERS THEREOF

(75) Inventors: John C. Wang, Taoyuan (TW); Yun-Long Tun, Taoyuan (TW); Yi-Shen Wang, Taoyuan (TW); Cheng-Chieh Chuang, Taoyuan (TW)

(73) Assignee: High Tech Computer, Corp., Taoyuan (TW)

( * ) Notice: Subject to any disclaimer, the term of this patent is extended or adjusted under 35 U.S.C. 154(b) by 238 days.

(21) Appl. No.: 12/318,368

(22) Filed: Dec. 29, 2008

(65) Prior Publication Data

US 2009/0179860 A1    Jul. 16, 2009

(30) Foreign Application Priority Data

Dec. 27, 2007    (TW) ................................ 96150471 A

(51) Int. Cl.
*G06F 3/02* (2006.01)
(52) U.S. Cl. ........ 345/168; 345/169; 345/171; 345/172; 345/173; 715/810; 715/813; 715/831; 455/550.1; 455/556.2; 455/566
(58) Field of Classification Search ................... 345/168, 345/171, 169, 172, 173; 455/550.1, 556.2, 455/566; 715/780, 810, 813, 831
See application file for complete search history.

(56) References Cited

U.S. PATENT DOCUMENTS

| | | | | |
|---|---|---|---|---|
| 5,631,643 A * | 5/1997 | Hisamori et al. | ................ | 341/23 |
| 6,882,869 B1 * | 4/2005 | Toebes et al. | .................. | 455/566 |
| 7,190,349 B2 * | 3/2007 | Kim et al. | ..................... | 345/168 |
| 7,320,111 B2 * | 1/2008 | Volovitz | ......................... | 715/827 |
| 2003/0169240 A1 * | 9/2003 | Song | ............................. | 345/173 |
| 2004/0108994 A1 * | 6/2004 | Kato | .............................. | 345/171 |
| 2005/0063757 A1 * | 3/2005 | Sugimura et al. | ............. | 400/472 |
| 2005/0202840 A1 * | 9/2005 | Kespohl et al. | ............ | 455/550.1 |
| 2009/0140991 A1 * | 6/2009 | Takasaki et al. | ............... | 345/173 |

FOREIGN PATENT DOCUMENTS

| | | |
|---|---|---|
| EP | 1 383 034 A1 | 1/2004 |
| EP | 1 513 049 A2 | 3/2005 |
| TW | 200638248 | 4/2005 |
| TW | 292858 | 12/2005 |
| WO | 02/095524 A2 | 11/2002 |
| WO | 2007/084078 A1 | 7/2007 |

OTHER PUBLICATIONS

Search Report issued on Nov. 30, 2009, in corresponding European application No. 08 172 975.8.
Office Action dated Mar. 22, 2011 issued in corresponding Taiwan application No. 096150471.

* cited by examiner

*Primary Examiner* — Lun-Yi Lao
*Assistant Examiner* — Priyank Shah
(74) *Attorney, Agent, or Firm* — Bacon & Thomas, PLLC

(57) ABSTRACT

The present invention relates to a method for selecting characters and a device thereof. The method comprises the steps of sensing a touch on a first key, which has a plurality of characters marked thereon; confirming the touch and displaying the plurality of characters associated with the first key on a display unit; sensing a shifting motion of the touch on the first key; and selecting one of the plurality of characters associated with the first key in response to the shifting motion of the touch. The present invention further provides a character input module and an electronic device for implementing the character selection method.

10 Claims, 8 Drawing Sheets

ELECTRONIC DEVICE, CHARACTER INPUT MODULE AND METHOD FOR SELECTING CHARACTERS THEREOF

BACKGROUND OF THE INVENTION

1. Field of the Invention

The present invention relates to a character input or character selection method and a device implementing the method. More particularly, the invention relates to an electronic device having a character input interface, to a method for selecting characters, and to a character input module.

2. Description of the Related Art

Generally, a conventional mobile phone (as shown in FIG. 9), or other sorts of handheld devices such as PDA, is not allowed to be equipped with as many keys as possible due to size limitations. Therefore, using a single key to enter two or more categories of characters, e.g. Chinese ZhuYin characters (phonetic spelling of Chinese characters), numeric characters (numbers), Roman alphabetic characters (letters) or special symbols, is very common for such devices. Moreover, each character system contains two or more characters or symbols. As such, to switch among all the character input modes, e.g. number, ZhuYin and alphabetic input modes, the user needs to perform additional key-pressing operation for switching to another input mode or selecting desired characters.

For example, when the user wants to enter a character string that reads "我的baby 今年5歲" (meaning "my baby is five years old this year" in English), the user needs to go through the following steps: selecting the ZhuYin input mode first to enter the Chinese characters "我的"(my); switching to the lower case alphabetic input mode to enter the English word "baby"; switching back to the ZhuYin input mode to enter the Chinese characters "今年"(this year); switching to the number input mode to enter the number "5"; and switching to the ZhuYin input mode again to enter the Chinese character "歲"(years old). This process of inputting a character string requires 5 input mode switches, and each input switch requires the user to press keys for 3 to 5 times. Thus, conventional operating processes of inputting or selecting characters are indirect and complicated, making the usage of such devices low efficient.

Furthermore, the user cannot enter a character of different category continuously with the same key when using a prior art device; rather, he or she is required to first select a different character input mode before pressing that key to input characters. Also, to select one out of many characters using a prior art device, the user needs to press the same key plural times before seeing the desired character show up on the display. However, the keys on which plural categories of characters are shown are generally of a quite small size. It is difficult for the user to see how many presses it takes for the desired character to show up.

Therefore, it has been an objective for keypad designers to provide users with a fast, simple, and intuitive method for selecting or inputting characters.

SUMMARY OF THE INVENTION

An object of the invention is to provide an electronic device having a simplified method for inputting characters.

Another object of the invention is to provide a simplified method for selecting characters.

Yet another object of the invention is to provide a character input module that utilized the simplified method for inputting characters.

The present invention provides a method for selecting characters. The method comprises the steps of sensing an action on a first key, which has a plurality of characters marked thereon; displaying the plurality of characters on a display unit in response to the action; sensing a shifting motion of the action on the first key; and selecting one of the plurality of characters in response to the shifting motion of the action.

A character input module of the present invention to achieve the above objects is provided. The character input module comprises a keypad, a sensor unit and a character output circuit. The keypad comprises at least one key on which a plurality of characters are marked. The sensor unit is disposed beneath the keypad to sense an action on the key and to generate a first signal in response to a shifting motion of the action. The character output circuit is electrically connected to the sensor unit and outputs a code corresponding to one of the plurality of characters on the key according to the first signal.

An electronic device of the present invention to achieve the above objects is provided. The electronic device comprises a keypad, a sensor unit, a display unit and a character output circuit. The keypad comprises at least one key on which a plurality of characters are marked. The sensor unit is disposed beneath the keypad to sense an action on the key and to generate a first signal in response to a shifting motion of the action. The display unit has a character selection area and a character input area defined thereon, wherein the character selection area displays the plurality of characters. The character output circuit electrically connected to the sensor unit and outputs one of the plurality of characters to the display unit according to the first signal, so that the character is displayed on the character input area.

With the electronic device, character input module and character selection method of the present invention, the user is able to perform the character selection process on a single key easily. The user can select the desired character from plural characters quickly; moreover, the user can select the desired character among different character categories without switching the input mode in advance.

The above objects and features of the present invention will become better understood with following descriptions and accompanying drawings, which are provided only for further elaboration without limiting or restricting the scope of the present invention.

DETAILED DESCRIPTION OF THE PREFERRED EMBODIMENTS

The present invention now will be described more fully hereinafter with reference to the accompanying drawings, in which preferred embodiments of the invention are shown. It is to be understood that all kinds of alterations and changes can be made by those skilled in the art without deviating from the spirit and the scope of the invention. This description is not to be taken in a limiting sense, but is made merely for the purpose of illustrating the general principles of the invention.

An electronic device of the present invention relates to an electronic device having a character input interface. In an embodiment of the invention, the character input interface may be embodied in a physical keypad.

Figure 1:
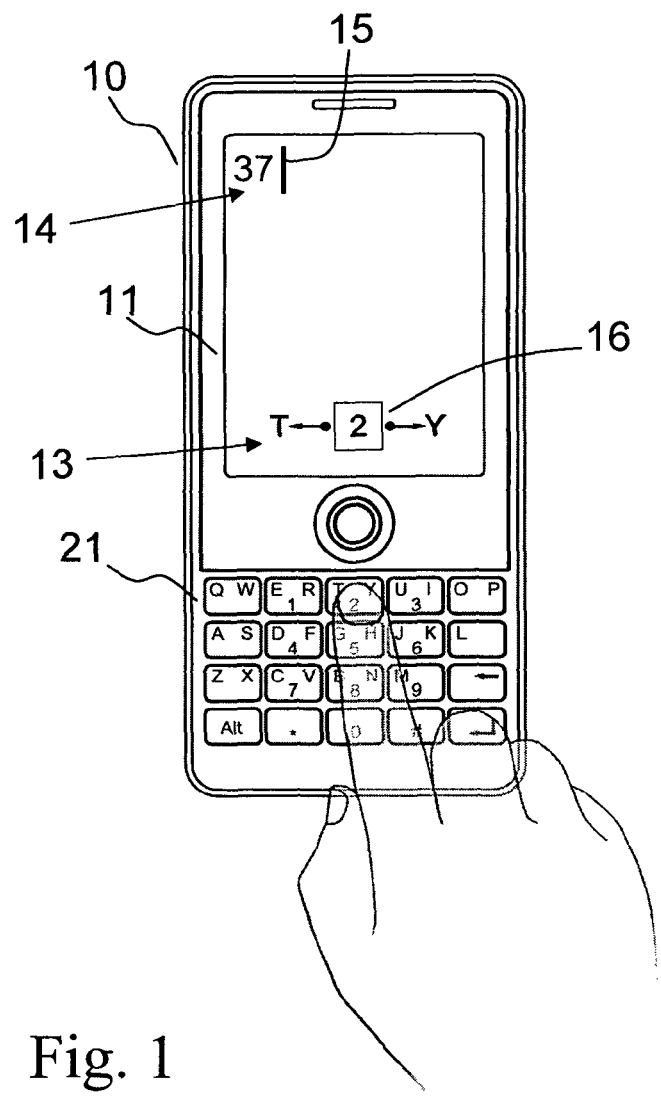
FIG. 1 is a schematic view that shows operating a mobile phone according to the present invention.

FIG. 1 is a schematic view that shows operating an electronic device of the present invention. This exemplary embodiment illustrates a mobile phone with a physical keypad, which embodies a character input interface. However, the electronic device of the present invention is not limited to a mobile phone; it may be a personal digital assistant (PDA) or a portable computer, etc. The mobile phone 10 comprises a display unit 11 and a keypad 21. The keypad 21 has a plurality of keys, and each key has a plurality of characters marked thereon. The characters marked thereon include plural ones of the same category; the characters may also include single or plural ones of different categories. As shown in FIG. 1, alphabetic characters and numeric character, which belong to different categories, are marked on the key that the user's finger points to. The alphabetic characters include characters "T" and "Y", and the numeric character includes a character "2".

The display unit 11 of the mobile phone 10 has a character selection area 13 and a character input area 14, as shown in FIG. 1. The character selection area 13 is located near the bottom of the screen, and the character input area 14 displays the selected characters at the position where the cursor shows up. When the user operates the mobile phone of this invention to input characters and points to one key on the keypad 21 with the finger, the plurality of characters marked on that key will be displayed on the character selection area 13 of the display unit 11. At the same time, one of the displayed characters will be highlighted as a preselected character. Further, signs or symbols indicating shifting directions are displayed among the plurality of characters on the character selection area 13, guiding the user to select a character according to the shifting direction.

In an embodiment of the invention, as shown in FIG. 1, the key that the user's finger touches makes the characters "T" "Y" and "2", which are marked on that key, to be displayed on the character selection area 13. The displayed character "2" is highlighted by a block 16, indicating it is a preselected character; the left arrow indicates the direction to select the character "T", and the right arrow indicates the direction to select the character "Y".

In an embodiment of the invention, the arrangement of displayed characters and the preselected character can be determined according to the previously entered character. If a numeric character is entered through the previous key, then the numeric one among the characters associated with the present key will be highlighted as the preselected character. Similarly, if an alphabetic character is entered through the previous key, one of the alphabetic characters associated with the present key will be determined as the preselected character according to a predictive text input method. As shown in FIG. 1, the arrangement of displayed characters may be "2←[T]→Y" or "T←[Y]→2", according to the previously entered character or according to the input mode.

In this embodiment of the invention, a sensor unit 22 (see FIG. 5) is disposed beneath the keypad 21. Therefore, when the user's finger points to one of the keys on the keypad 21, the sensor unit 22 will sense an action on that key. Technically, the action may be embodied by different means, as will be further described below. In an embodiment of the invention, the action is embodied by approaching a key with a finger, and as the sensor unit 22 confirms the action occurs, the character selection area 13 of the display unit 11 will display the characters marked on the approached key. In another embodiment of the invention, the action is embodied by touching a key, which may be done by a finger or by a stylus like touch pen, and as the sensor unit 22 confirms the action occurs, the character selection area 13 of the display unit 11 will display the characters marked on the touched key.

Figure 2:
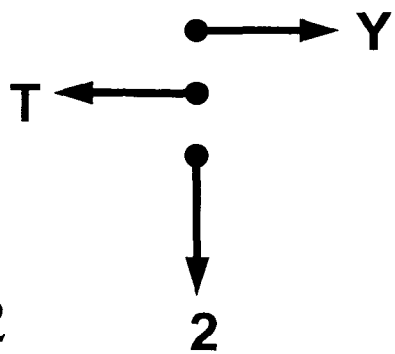
FIG. 2 is a schematic view that shows the shifting directions associated with selecting characters.

When the character selection area 13 of the display unit 11 displays the characters marked on the approached or touched key, the user can perform a shifting motion according to the direction signs or symbols displayed on the character selection area 13, as shown in FIG. 2.

In one embodiment of the invention, as shown in FIG. 1 and FIG. 2, when a finger approaches or touches a key, the character selection area 13 displays the plurality of characters associated with that key. Afterwards, when the finger shifts right, the character "Y" is selected and entered, and the character input area 14 of the display unit 11 will display the character "Y". When the finger shifts left, the character "T" is selected and entered, and the character input area 14 of the display unit 11 will display the character "T". When the finger shifts down, the character "2" is selected and entered, and the character input area 14 of the display unit 11 will display the character "2". In another embodiment of the invention, if the user wants to select the preselected character "2", the user may press or click the key directly with a finger, and the character "2" will be displayed on the character input area 14. Alternatively, the user may touch the key directly, and after the touch ends, the character "2" will be displayed on the character input area 14.

Figure 3A:
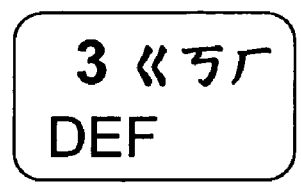
FIG. 3A illustrates a key with a plurality of characters shown thereon.
Figure 3B:
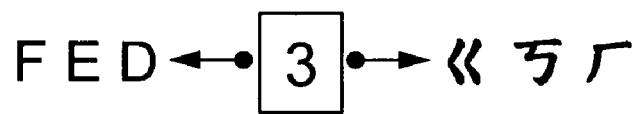
FIG. 3B shows how the characters of the key are displayed on the display unit.

In an embodiment of the invention, each key of the keypad 21 has plural characters of different categories marked thereon. As shown in FIG. 3A, there are numeric, ZhuYin and alphabetic characters marked on the key, wherein the numeric character includes a character "3", the ZhuYin character includes plural characters "<<", "ㄅ"and "ㄈ", and the alphabetic character includes plural characters "D", "E" and "F". When the finger approaches or touches the key shown in FIG. 3A, all the characters marked on the key, including "F", "E", "D", "3", "<<", "ㄅ"and "ㄈ", will be displayed on the character selection area 13. And as shown in FIG. 3B, the character "3" is determined as the preselected character; a left arrow and a right arrow are also displayed to indicate shifting directions.

Figure 3C:
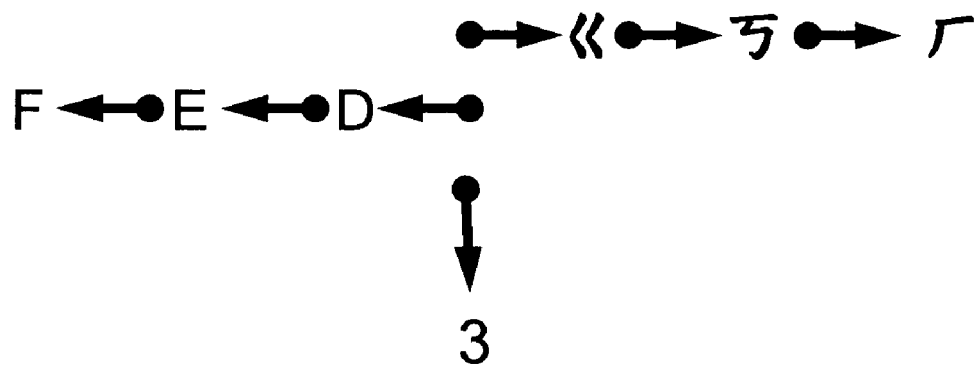
FIG. 3C shows the shifting directions associated with selecting characters.

The user can perform a character selection process with the key as indicated in FIG. 3C. When the finger shifts right once, the character "<<" is selected; when the finger shifts right twice, the character "ㄅ"is selected; when the finger shifts right three times, the character "ㄈ"is selected; when the finger shifts left once, the character "D" is selected; when the finger shifts left twice, the character "E" is selected; when the finger shifts left three times, the character "F" is selected; and when the finger shifts down once, the character "3" is selected. Afterwards, after the finger presses or clicks the key, the selected character will be entered and displayed on the character input area 14.

In an embodiment of the invention, the keypad 21 may be implemented and displayed on the display unit 11 as a virtual keypad, which has a touch screen that embodies the sensor unit. When the user uses a finger or a stylus to touch one key on the virtual keypad 21 displayed on the touch screen, the character selection area 13 of the display unit 11 will display the corresponding characters. Then, the user can select one of the characters easily by shifting the finger or the stylus to a direction on the touch screen.

Figure 4:
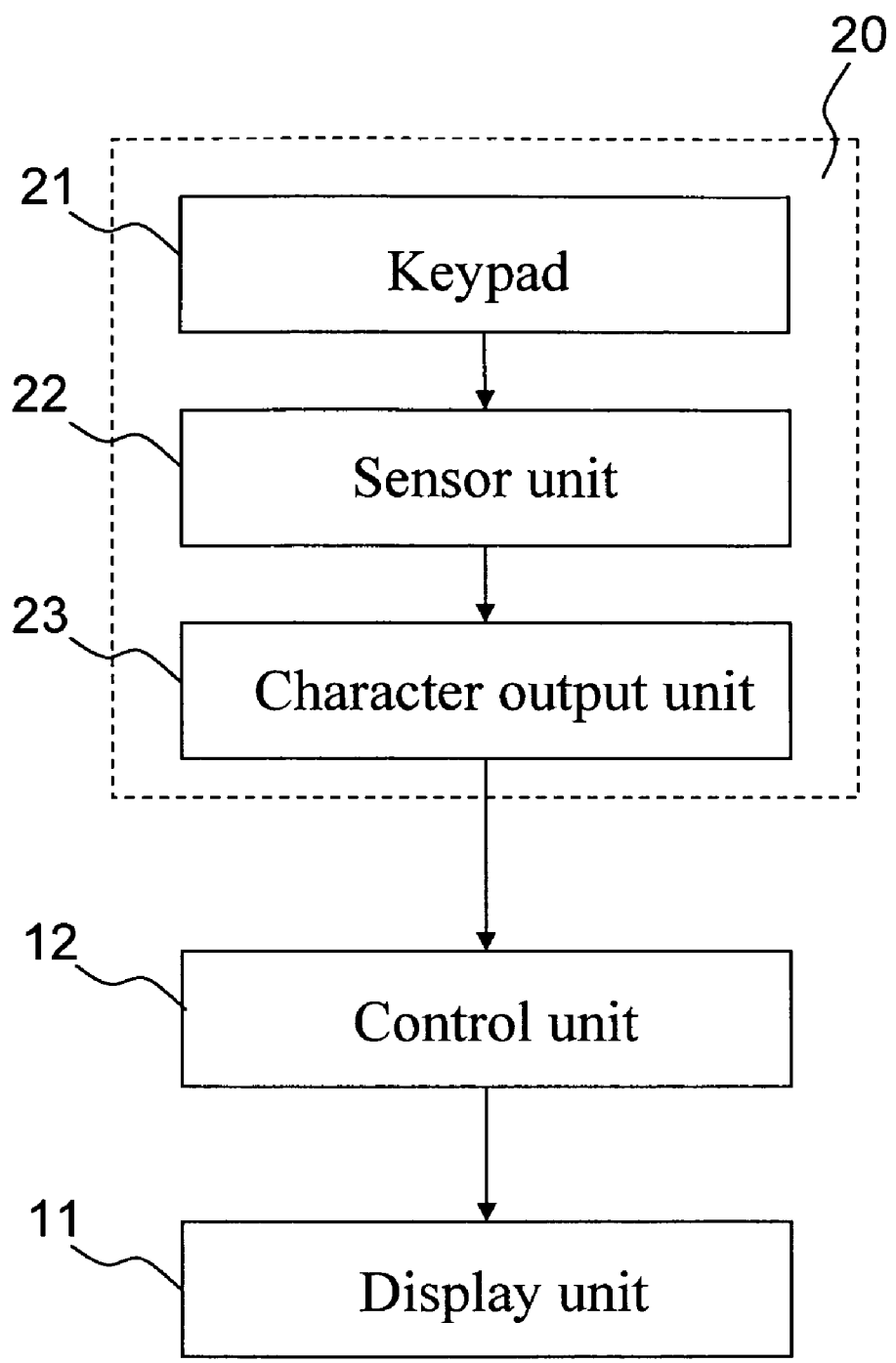
FIG. 4 is a block diagram showing an electronic device of the present invention.

Referring to FIG. 4, a block diagram illustrating an electronic device of the present invention is shown. In an embodiment of the invention, an electronic device comprises a character input module 20, a control unit 12 and a display unit 11, wherein the character input module 20 comprises a keypad 21, a sensor unit 22 and a character output unit 23. The keypad 21 includes a plurality of keys, each key having a plurality of characters marked thereon, as shown in FIG. 1 and FIG. 3A. The sensor unit 22 is configured for sensing an action on the key and the shifting direction of the action; then, in response to the shifting direction, the sensor unit 22 sends a first signal to the character output unit 23. The character output unit 23 analyzes the first signal and then outputs a corresponding code to the selected character to the control unit 12. The control unit 12 sends the corresponding code to the display unit 11 so that the selected character can be displayed on the character input area 14 of the display unit 11.

In this embodiment, after the sensor unit 22 senses and confirms an action has occurred on a key, the sensor unit 22 generates a second signal and sends it to the character output unit 23. The character output unit 23 analyzes the second signal and then sends a corresponding key code to the control unit 12. According to the key code, the control unit 12 then makes all of the characters associated with that key to be displayed on the character selection area 13 of the display unit 11, and determines a character to be the preselected character at the same time. Accordingly, the user performs a shifting motion according to the direction signs or symbols displayed on the character selection area 13. Then, the sensor unit 22 senses the shifting motion and sends the first signal to the character output unit 23. Next, the character output unit 23 analyzes the first signal and sends a corresponding code of the selected character to the control unit 12.

In an embodiment of the invention, the character output unit 23 or the control unit 12 can determine an input mode or a preselected character for a following key according the selected character. The character output unit 23 may be embodied by an application-specific integrated circuit (ASIC). Alternatively, the signal analysis or other functionalities of the character output unit 23 may be implemented by the control unit 12, so that the circuits and components inside the electronic device are further integrated, which helps to reduce the cost and size of the device.

In one embodiment of the invention, the keypad 21 comprises a mode key (not shown) for selecting one of the character input modes; as a result, the key following the mode key operation will select one of the characters from the same category according to the selected input mode. When the sensor unit 22 senses and confirms that an action occurs on the mode key, a third signal is generated by the sensor unit 22 and sent to the character output unit 23. The character output unit 23 analyzes the third signal associated with the mode key and then sends its key code to the control unit 12. Based on the received key code, the control unit 12 makes the character selection area 13 of the display unit 11 display plural character input modes, such as ZhuYin, numeric and alphabetic input modes, and display shifting directions as well.

When the user performs a shifting motion according to the shifting directions shown on the character selection area 13, the sensor unit 22 then senses the shifting motion and sends a fourth signal to the character output unit 23. The character output unit 23 may analyze the fourth signal and then sends a corresponding code of the selected input mode to the control unit 12, so that it can further determine an input mode for the following key according to the selected input mode. Alternatively, the character output unit 23 may analyze the fourth signal to determine a selected input mode, based on which the character output unit 23 can further determine a character input mode for the following key.

In an embodiment of the invention, the sensor unit 22 may be embodied by a camera module. The camera module captures images from top of the keypad 21. The character output unit 23 then receives the images of operating the keypad 21 from the camera module. By applying image analysis technology to determine which key the finger has pointed to and which shifting direction has occurred on the key, the character output unit 23 can send the key code of that key and the short code of the selected character to the control unit 12.

Figure 5:
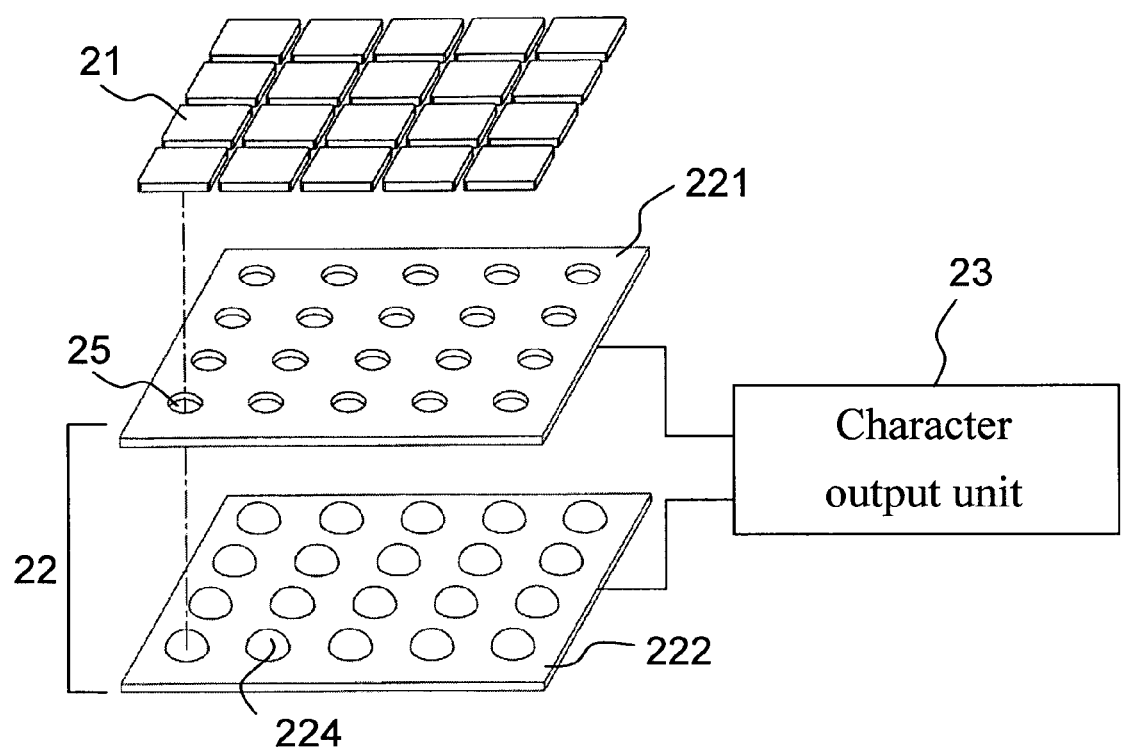
FIG. 5 is an exploded view showing a character input module of the present invention.

Referring to FIG. 5, an exploded view showing a character input module of the present invention is shown. The sensor unit 22 is disposed beneath the keypad 21. In an embodiment of the invention, the keypad 21 includes a plurality of keys, and technically, the embodiment of the sensor unit 22 includes a direction sensing board 221 and a membrane circuit board 222, and the two boards 221 and 222 are electrically connected to the character output unit 23 respectively. The direction sensing board 221, disposed beneath the keypad 21, spreads throughout all of its keys to sense shifting motions occurring on any of the keys and sends a first signal to the character output unit 23. Preferably, the direction sensing board 221 is embodied by a capacitive touch sensor. In other embodiments of the invention, however, the direction sensing board 221 spreading beneath the keypad 21 throughout all of its keys may be embodied by a resistive touch sensor, surface acoustic wave touch sensor, or infrared touch sensor.

The membrane circuit board 222 of the sensor unit 22 comprises a plurality of metal dome switches 224, each of which corresponds to a key on the keypad 21. In response to a press on the key, the metal dome switches 224 enables the sensor unit 22 to send a signal to the character output unit 23.

Figure 6A:
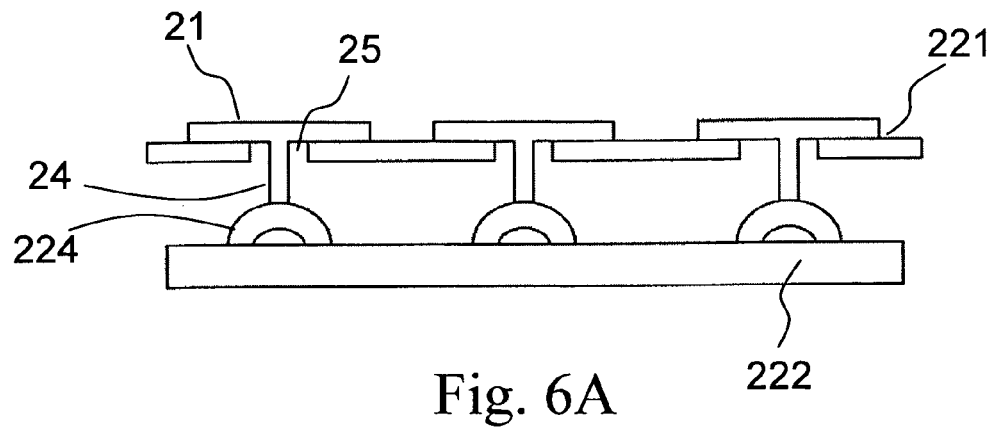
FIG. 6A and FIG. 6B are sectional views respectively showing the combination of a keypad and a sensor unit according to two embodiments of the present invention.

Referring to FIG. 6A, a sectional view illustrating the combination of the keypad 21 and the sensor unit 22 in FIG. 5 is shown. Each key of the keypad 21 has a protruding post 24 configured underneath, which projects through a hole 25 on the direction sensing board 221; the hole 25 corresponds to the key of the keypad 21, as shown in FIG. 5. The protruding post 24 connects against a metal dome switch 224 on the membrane circuit board 222. When the user presses or clicks the key, the corresponding metal dome switch 224 will enable electrical connection in response to the action, so that the character output unit 23 will recognize which key has been pressed.

Figure 6B:
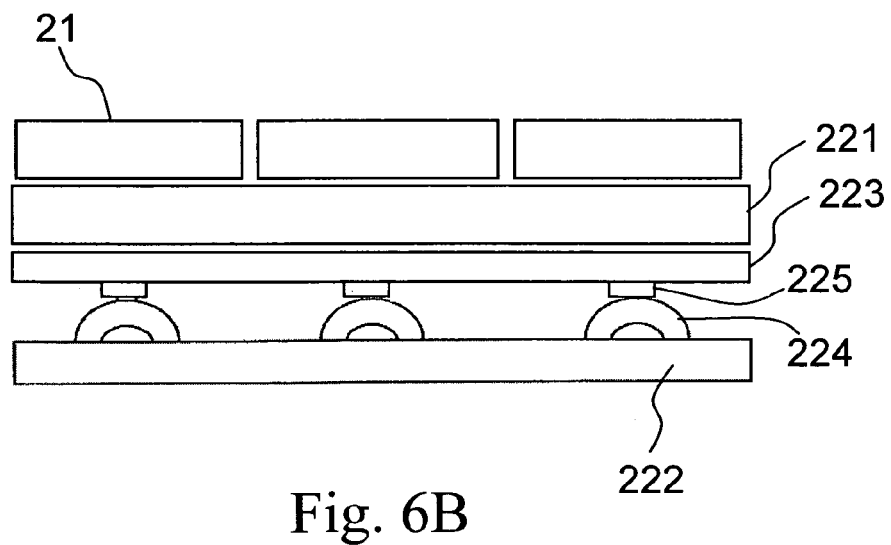

Referring to FIG. 6B, a sectional view illustrating the combination of the keypad 21 and the sensor unit 22 according to another embodiment of the invention is shown. In this embodiment, the direction sensing board 221 is preferably a capacitive touch sensor configured beneath the keypad 21; however, each key of the keypad 21 does not have a protruding post configured underneath, and the direction sensing board 221 does not contain any holes. A pad 223 disposed between the direction sensing board 221 and the membrane circuit board 222 is added. A protruding point 225 is formed on a surface of pad 223 that faces the membrane circuit board 222, the protruding point 225 corresponding to both a key and a metal dome switch 224 in position. When the user uses a finger to approach or touch a key, the direction sensing board 221 will sense the action of approaching or touching and then send a signal to the character output unit 23. Thus, the display unit 11 will display the plurality of characters associated with that key on the character selection area. When the user's finger performs a shifting motion on the key, the direction sensing board 221 will sense the shifting motion and send another signal to the character output unit 23. In consequence, one of the character which corresponds to the shifting motion will be highlighted by said block around it, meaning the desired character is selected. Next, when the user's finger presses the surface of that key, the corresponding protruding point 225 of the pad 223 will actuate the metal dome switch 224 to make electrical connection, which allows the character output unit 23 to recognize which key has been pressed. Accordingly, the selected character is entered and displayed on the character input area of the display unit 11.

In another embodiment, the user's finger presses the surface of one key first, which causes a corresponding metal dome switch 224 to make electrical connection and send a signal; in consequence, the display unit 11 will display the plurality of characters associated with that key on the character selection area. Then, the user's finger performs a shifting motion on the key; the direction sensing board 221 senses the shifting motion and sends another signal to the character output unit 23, causing a character which corresponds to the shifting motion shown on the display unit 11 to be selected with said block around it. Finally, the user's finger leaves the surface of the key (meaning the finger touch on the key has finished), and the selected character is entered and displayed on the character input area of the display unit 11.

Figure 7:
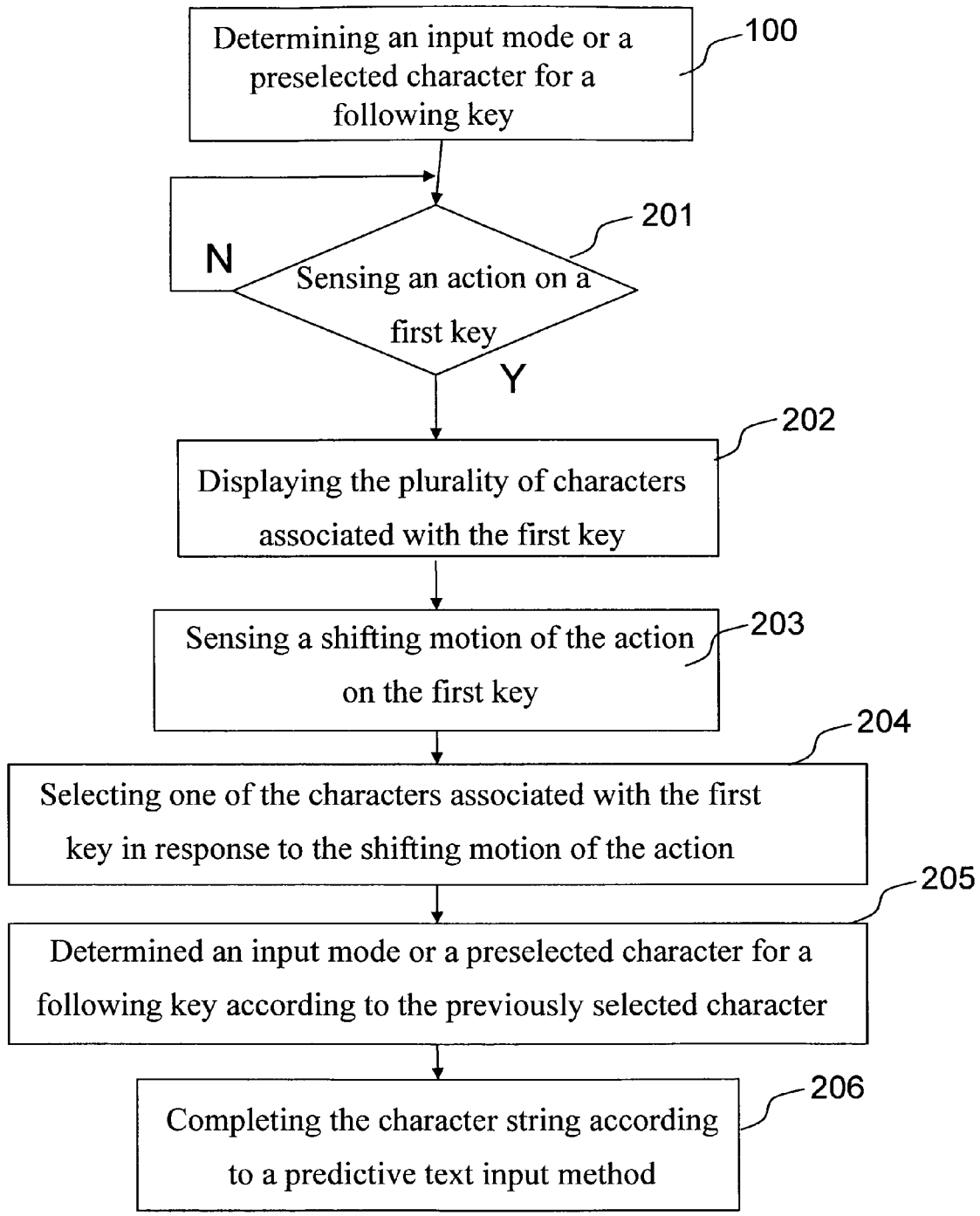
FIG. 7 is a flowchart showing the method steps of the present invention.

FIG. 7 is a flowchart showing the method steps of the present invention. The method includes steps 100 to 206. In an embodiment of the invention, step 100 is determining an input mode for a following key, and steps 201 to 204 are basically operating a single key to select different characters from the same category—for example, selecting one of the ZhuYin characters in the ZhuYin input mode, or selecting one of the letters in the alphabetic input mode. By repeating steps 201 to 205, a string of characters that belong to the same category can be input. In the ZhuYin input mode, step 206 may include completing the character string according to a predictive text input method and displaying a list of candidate characters.

In another embodiment of the invention, step 100 is determining a preselected character for a following key, and steps 201 to 204 are basically operating a single key to select different characters from different categories—for example, selecting a character among the ZhuYin characters, or selecting a letter among the alphabetic letters. By repeating steps 201 to 205, a string of characters that belong to different categories can be input. In step 206, English letters or Chinese characters may be input by completing the character string according to a predictive text input method.

Steps 201 to 204 will be elaborated further below. Step 100 is determining an input mode or a preselected character for a following key. After that, step 201 is continuously sensing an action on any key of the keypad; when the user points to a first key and the action is sensed and confirmed by the sensor unit, the process will move on to step 202. Step 202 is displaying the plurality of characters associated with the first key on the character selection area of the display unit 11. Then, step 203 is further sensing the shifting motion of the action on the first key; after the shifting motion is confirmed, the process will move on to step 204. Step 204 is selecting one of the characters associated with the first key in response to the shifting motion of the action. Step 204 further comprises displaying the selected character on the character input area of the display unit.

In step 205, during which operating a single key is performed serially, an input mode or a preselected character for a following key is determined according to the previously selected character. Therefore, the time needed for operating a single key is reduced, and it would also require fewer numbers of mode-switching times.

Figure 8:
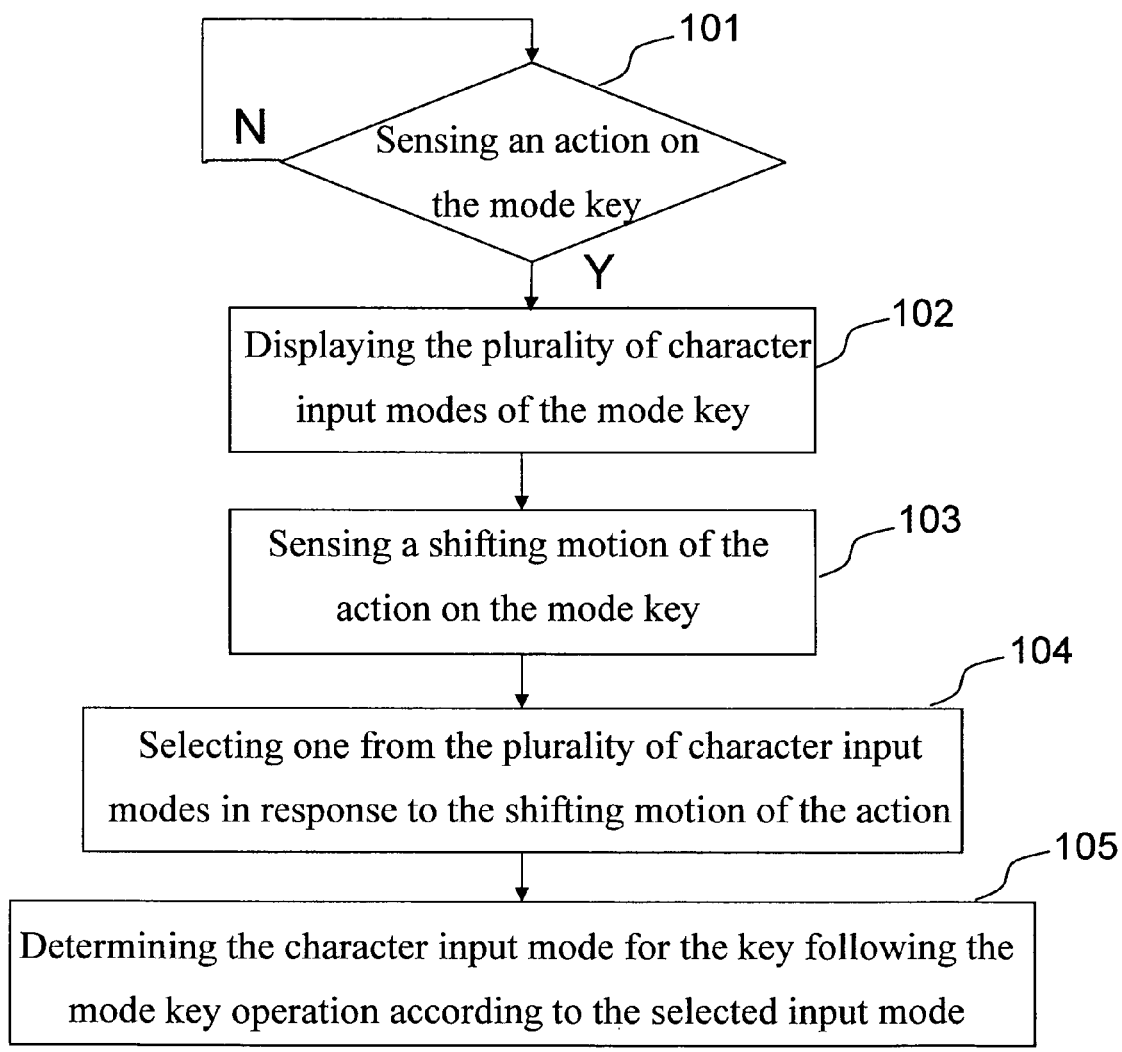
FIG. 8 is a flowchart showing the steps of determining a character input mode according to the method of the present invention.
Figure 9:
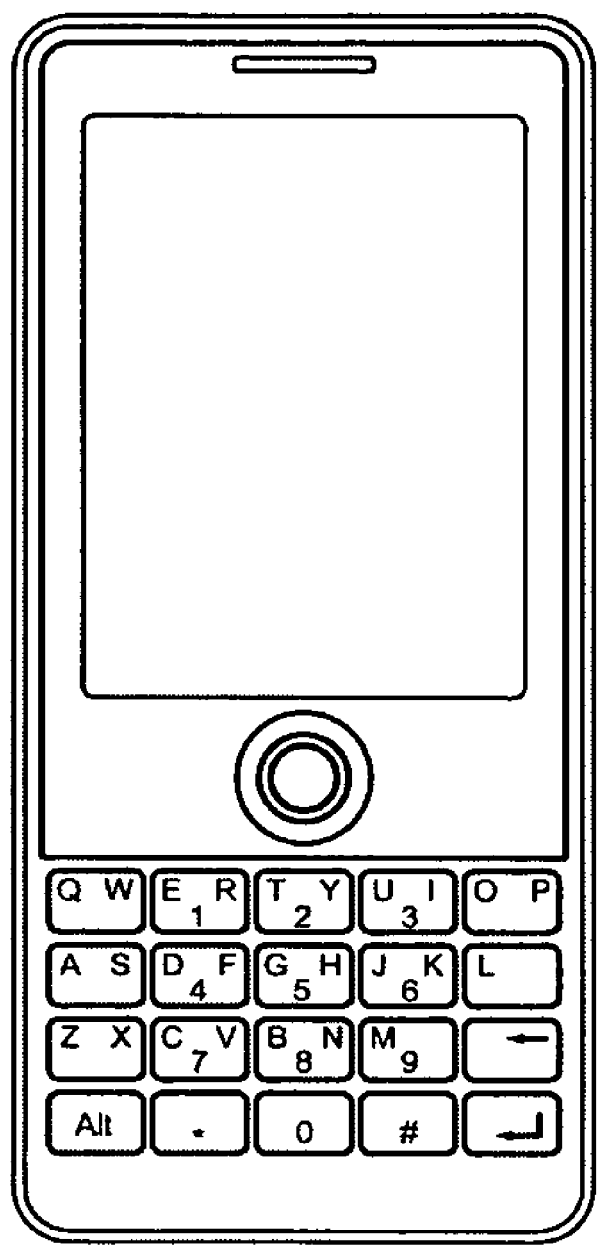
FIG. 9 is a frontal view of a conventional mobile phone.

FIG. 8 is a flowchart showing the steps of determining a character input mode according to the method of the present invention. In an embodiment of the invention, the keypad 21 comprises a mode key for switching among a plurality of character input modes. Steps 101 to 105 will be elaborated further below. Step 101 is continuously sensing an action on the mode key. When the user points to the mode key and the sensor units confirms the action occurs on the mode key, the process will move on to step 102. Step 102 is displaying all the character input modes from which the user could select one on the character selection area of the display unit. Step 103 is further sensing and confirming a shifting motion of the action on the mode key. Step 104 is selecting one from the plurality of character input modes in response to the shifting motion of the action. Finally, step 105 is determining the character input mode, according to the selected input mode, for the key following the mode key operation.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. A method for selecting characters, comprising:
sensing a first touch on a first key;
displaying a plurality of characters and highlighting a first character of said plurality of characters on a display unit in response to said first touch;
sensing at least one shifting motion of said first touch on said first key, wherein the at least one shifting motion shifts at a direction;
selecting a second character of said plurality of characters in response to said at least one shifting motion;
sensing a second touch on a second key;
determining a preselected character for said second key according to said selected second character; and
highlighting said preselected character, which is of the same category as said selected second character but is not of the same category as said first character, on said display unit in response to said second key.

2. The method of claim 1, wherein the step of displaying said plurality of characters and highlighting said first character of said plurality of characters on a display unit further comprises:
displaying at least one direction sign to indicate the direction for selecting the second character.

3. The method of claim 1, wherein prior to the step of sensing said first touch on said first key, the method further comprises:
determining an input mode for said first key.

4. The method of claim 3, wherein the step of determining an input mode for said first key further comprises:

sensing a third touch on a third key, said third key corresponding to a plurality of input modes;

displaying said plurality of input modes on said display unit in response to said third touch on said third key;

sensing a second shifting motion of said third touch on said third key; and selecting one of said plurality of input modes, to which said third key corresponds, to be the input mode for said first key in response to said second shifting motion of said third touch.

5. The method of claim 4, wherein said plurality of input modes include a ZhuYin input mode and an alphabetic input mode.

6. The method of claim 4, wherein said plurality of input modes include an alphabetic input mode and a number input mode.

7. The method of claim 1, wherein the plurality of characters is displayed in a row on a display unit.

8. The method of claim 1, wherein the at least one shifting motion includes two shifting motions, and a third character is displayed between said second character and said first character.

9. The method of claim 1, wherein the first character is a numeric character and the second character is an alphabetic character.

10. The method of claim 1, wherein the first character is an alphabetic character and the second character is a numeric character.

* * * * *